(12) United States Patent
Scherer et al.

(10) Patent No.: US 9,243,124 B2
(45) Date of Patent: Jan. 26, 2016

(54) USE OF ESTERS AS COALESCING AGENTS

(75) Inventors: Markus Scherer, Köln (DE); Edda Bergmann, Düsseldorf (DE); Sascha Oestreich, Düsseldrof (DE); Miriam Becherer, Mülheim (DE); Harald Frommelius, Monheim (DE)

(73) Assignee: Cognis IP Management GmbH, Duesseldorf (DE)

( * ) Notice: Subject to any disclaimer, the term of this patent is extended or adjusted under 35 U.S.C. 154(b) by 236 days.

(21) Appl. No.: 13/988,466

(22) PCT Filed: Aug. 10, 2011

(86) PCT No.: PCT/EP2011/003989
§ 371 (c)(1),
(2), (4) Date: May 20, 2013

(87) PCT Pub. No.: WO2012/069098
PCT Pub. Date: May 31, 2012

(65) Prior Publication Data
US 2013/0245175 A1    Sep. 19, 2013

(30) Foreign Application Priority Data
Nov. 25, 2010 (EP) .................................. 10192567

(51) Int. Cl.
*C08K 5/101* (2006.01)
*C09D 5/02* (2006.01)
*C09D 7/06* (2006.01)
*C09D 133/08* (2006.01)

(52) U.S. Cl.
CPC ................ *C08K 5/101* (2013.01); *C09D 5/024* (2013.01); *C09D 7/06* (2013.01); *C09D 133/08* (2013.01)

(58) Field of Classification Search
CPC ........... C08K 5/101; C09D 7/06; C09D 5/024
See application file for complete search history.

(56) References Cited

U.S. PATENT DOCUMENTS

| | | | |
|---|---|---|---|
| 3,399,158 A | 8/1968 | Huitson | |
| 4,043,984 A | 8/1977 | Keil et al. | |
| 4,141,864 A | 2/1979 | Rijke et al. | |
| 4,177,177 A * | 12/1979 | Vanderhoff et al. | .......... 523/300 |
| 4,489,188 A | 12/1984 | Jones et al. | |
| 4,489,406 A | 12/1984 | Hsieh et al. | |
| 5,756,569 A | 5/1998 | Carver et al. | |
| 6,762,230 B2 | 7/2004 | Brandenburger et al. | |
| 2005/0182168 A1 | 8/2005 | Bloom et al. | |

FOREIGN PATENT DOCUMENTS

| | | | |
|---|---|---|---|
| EP | 0026982 | 9/1980 | |
| EP | 26982 A1 * | 4/1981 | ............. C08K 5/101 |
| EP | 0501614 | 1/1992 | |
| EP | 0599478 | 10/1993 | |
| GB | 1490232 | 10/1974 | |
| WO | WO-0056823 | 3/2000 | |
| WO | WO-2008135170 | 11/2008 | |

\* cited by examiner

*Primary Examiner* — Michael Pepitone
(74) *Attorney, Agent, or Firm* — Servilla Whitney LLC

(57) ABSTRACT

The invention relates to esters, the acid component of which is a monocarboxylic acid having 8 to 12 C atoms and the alcohol component of which is selected from the group of the pentanols, wherein said esters are excellently suited as coalescing agents.

6 Claims, No Drawings

USE OF ESTERS AS COALESCING AGENTS

CROSS-REFERENCE TO RELATED APPLICATIONS

This application is the national stage entry of PCT/EP2011/003989, filed on Aug. 10, 2011, which claims priority to European Patent application number 10192567.5, filed on Nov. 25, 2010, both of which are incorporated herein by reference in their entireties.

FIELD OF THE INVENTION

The invention relates to the use of esters whose acid component is a monocarboxylic acid having 8 to 12 C atoms and whose alcohol component is selected from the group of the pentanols as coalescents, in particular for the preparation of coating materials.

PRIOR ART

Coalescents (also called film-forming assistants) are known per se. They are added to aqueous coating materials and bring about filming of the dispersed polymer particles to form a homogeneous coating film. Adding them is required when the film-forming temperature of the binder is above the temperature of the application.

Known film-forming assistants include the following: ethylene glycol ethyl ether, ethylene glycol propyl ether, ethylene glycol butyl ether, ethylene glycol hexyl ether, diethylene glycol methyl ether, diethylene glycol ethyl ether, diethylene glycol butyl ether, diethylene glycol hexyl ether, propylene glycol n-butyl ether, dipropylene glycol n-butyl ether, dipropylene glycol methyl ether, tripropylene glycol methyl ether, propylene glycol phenyl ether, propylene glycol tert-butyl ether, 2,2,4-trimethyl-1,3-pentanediol monoisobutyrate, and 2,2,4-trimethyl-1,3-pentanediol diisobutyrate.

In recent times, for environmental reasons, water-based coatings have become very topical. In latex coatings, based in particular on small particles of synthetic polymers such as polyacrylates, coalescents have traditionally been used in substantial quantities. These coalescents (also called filming assistants) are added to the coatings in order to improve film formation. The function derives from the plasticizing effect exerted by the coalescent on the latex particles, enabling them to coalesce and form a continuous film. This film has optimum properties after the evaporation of the water. Important in the formation of a film is the temperature known as the film-forming temperature, at which (or below which) the polymer particles coalesce to form a film. The customary coalescents lower the film-forming temperature of the polymer.

Conventional coalescents are certain esters and ethers; known technical standards are the hydroxyl ester "Texanol" from Eastman (also often called TMB; a 2,2,4-trimethyl-1,3-pentanediol monoisobutyrate), and also "EGBE" from Union Carbide (ethylene glycol monobutyl ether).

DE 24 43 645 was published back in 1976. Explicitly disclosed therein is benzoic acid 1,2-propanediol monoester, albeit specifically in connection with amino resins. The claims are directed to "modified amino resins" which comprise compounds of the aryl-COO—X—OH type as modifiers.

U.S. Pat. No. 3,399,158 discloses diesters of $C_{2-6}$ dicarboxylic acids.

U.S. Pat. No. 4,489,188 was granted in 1984. Coalescents for coatings that are disclosed therein are adducts of EO and PO with aromatic carboxylic acids such as benzoic acid.

U.S. Pat. No. 4,894,406 from 1988 discloses 2-alkyl-1,3-hexanediol alkyl esters, i.e., special hydroxyl esters, as coalescents.

U.S. Pat. No. 5,756,569 from 1996 discloses 3-alkoxypropionates as coalescents.

EP 069,839 B1 claims the use of hydroxyl ester mixtures as flow control assistants for aqueous polymer dispersions. The compounds are those obtainable by reacting propylene oxide with aliphatic $C_{7-12}$ monocarboxylic acids.

So-called reactive coalescents were mentioned at an early stage, as for example in U.S. Pat. No. 4,141,864. Dicyclopentenyloxyethyl methacrylate was used therein, but was said to have odor-related drawbacks.

According to EP 599,478 A1, acetoacetates can be used as a reactive coalescent.

EP 501,614 A2 from 1991 cites esters of ketocarboxylic acids as coalescents.

The claims of European patent EP 1,169,397 B1 are directed to film-forming compositions where polymers or prepolymers are emulsified in aqueous phase and where the composition comprises a coalescent which is an ester and is characterized by the formula R—COOX. R and X in this formula are hydrocarbyl groups or substituted hydrocarbyl groups. At least one of the two radicals must comprise at least two C=C double bonds.

US 2005/0182168 A1 discloses a combination of glycol esters of vegetable oil-based fatty acids and antioxidants. Propylene glycol monoesters are a specific topic therein.

WO 00/56823 discloses film-forming compositions having an aqueous phase and a dispersed phase, the latter comprising a polymer and a coalescent. The latter is an ester subject to the structural proviso that the acid component and/or the alcohol component must comprise at least two C=C double bonds. The technical purpose of this multiplicity of double bonds is that the coalescent itself is reactively crosslinked; it is referred to as a reactive coalescent.

Claim 1 of U.S. Pat. No. 6,762,230 B2 is directed to coating compositions comprising a latex polymer and a coalescent of the formula $R^1$—(CO—$X_r$—O)$_n$—$R^2$. In this formula, $R^1$ is an organic group, X is a divalent organic group, the index r can be 0 or 1, the index n can be in the range from 1 to 10, and $R^2$ is hydrogen or an organic group. Where r adopts a value of 0 and n a value of 1, and where the radicals $R^1$ and $R^2$ are alkyl radicals, the stated formula circumscribes fatty acid esters. It is pointed out, however, that fatty acid esters are not specifically disclosed in U.S. Pat. No. 6,762,230 B2. Instead, the coalescents of U.S. Pat. No. 6,762,230 B2 that are specifically discussed are not fatty acid esters.

Fatty acid alkyl esters are referred to in the two following texts: in EP 26982 A1 from 1980, aqueous coating compositions with a polymer and a coalescent are claimed. The latter is to be selected from a trio of "kinds" of esters; one of these kinds is characterized by the formula $R^1$—COOR$^2$. In this formula, $R^1$ is an alkyl or aryl group and $R^2$ is an alkyl group (bar methyl). In the paragraph bridging pages 11 and 12 it is explicitly stated that in the abovementioned ester formula it is preferably the case that $R^1$=$C_{3-7}$ and $R^2$=$C_{4-8}$ (both radicals aliphatic). At page 13 lines 10-33, suitable esters are listed by name. At page 13 line 35 et seqq. it is expressly stated that methyl and esters are generally to be avoided on account of their instability (tendency toward hydrolysis) in paint systems. Here, then, the skilled person is explicitly advised against using, as coalescents, esters whose alcohol component is methanol or ethanol, and is implicitly advised against using, as coalescents, esters whose alcohol component has 3 or 4 C atoms (since, in the preferred embodiment, as mentioned above, $R^2$ embraces a range of 4-8 C atoms). In particular there is no specific disclosure of any fatty acid esters whose alcohol component has 1 to 3 C atoms.

DE 2449471 A1 from 1974 claims esters of straight-chain $C_{2-6}$ fatty acids, the alcohol component of the esters being aliphatic $C_{3-4}$ alcohols, as solvents for coating materials. There is no reference there to coalescents.

WO 2008/135170 A1 describes the use of esters of the general formula $R^1$—$COOR^2$ in which $R^1$ is an alkyl radical having 9 to 23 C atoms and $R^2$ is a saturated alkyl radical selected from the group of methyl, ethyl, n-propyl, and isopropyl, as coalescents.

DESCRIPTION OF THE INVENTION

There is a constant need for new coalescents. The object of the present invention was therefore to provide coalescents. These coalescents ought to be suitable in particular for producing coatings such as paints, inks, and the like. The coalescents ought more particularly to be of a kind obtainable from renewable raw materials. Furthermore, the coalescents ought either to have a pleasing odor or to develop as little odor as possible, this being especially desirable for use as coalescents in interior paints.

The concept of coalescents (in the literature also called filming assistants or film-forming assistants) is to be understood in the sense which is set out above and which is very well known to the skilled person.

It is expressly stated that the coalescents to be developed in accordance with the invention are intended particularly for use in aqueous dispersions of polymers or latex particles that are suitable for coating purposes of any kind (for example, for water-based paints and inks).

Dispersions of this kind, which are prepared typically by emulsion polymerization and which—in addition to water, the auxiliaries used in emulsion polymerization, and the particles of polymer or of latex—may comprise further constituents which are commonly used for the particular desired coating purpose, are customarily applied to the surface to be coated; this is followed by evaporation of the water, and, finally, it is essential that the polymer particles or latex particles merge by flowing and form a homogeneous film. This process of film formation requires that at least a minimum temperature be observed, which is referred to by the skilled person as the minimum film-forming temperature (MFFT). Where the MFFT of a system is, for example, 20° C., this means that film formation proceeds successfully only when the temperature is 20° C. or higher. If, on the other hand, film formation is to be produced at lower temperatures, as for example at 10° C. or temperatures even lower, then the stated aqueous dispersions must be admixed with a coalescent in an amount such that the MFFT is lowered to the desired level.

In this respect the present invention has made it a goal in particular to develop coalescents which lower as effectively as possible the MFFT of aqueous dispersions of polymer particles or latex particles that are intended for any coating purposes.

The invention provides for the use of esters (I) whose acid component is a monocarboxylic acid having 8 to 12 C atoms and whose alcohol component is selected from the group of the pentanols as coalescents.

The Monocarboxylic Acids

As set out above, the monocarboxylic acid components of the esters (I) for use in accordance with the invention have 8 to 12 C atoms per molecule. These monocarboxylic acids may be linear or branched, saturated or unsaturated. Linear fatty acids are preferred here as monocarboxylic acids. Examples of suitable fatty acids are for instance:

Octanoic acid, nonanoic acid, decanoic acid (capric acid), undecanoic acid, dodecanoic acid (lauric acid), tridecanoic acid, and tetradecanoic acid (myristic acid), These fatty acids are among the saturated fatty acids. In the context of the present invention they are used preferably as acid components of the esters (I).

10-Undecenoic acid, lauroleic acid, and myristoleic acid. These fatty acids are among the unsaturated fatty acids, comprising a C=C double bond.

The Pentanols

As set out above, the alcohol components of the esters (I) comprises pentanols. Pentanols are monoalcohols having a total of five C atoms. Examples of pentanols are 1-pentanol (amyl alcohol), 2-pentanol, 3-pentanol, 3-methylbutan-1-ol (isoamyl alcohol) and 2-methylbutan-1-ol. The pentanols may be used individually or as a mixture with one another as alcohol components.

3-Methylbutan-1-ol and 2-methylbutan-1-ol are particularly preferred.

In one embodiment, fusel alcohols with a pentanols content, more particularly 3-methylbutan-1-ol (isoamyl alcohol), are used. Fusel oils are a mixture of middle and higher alcohols (fusel alcohols), fatty acid esters, terpenes, and furfurals. They are formed in the alcoholic fermentation as byproducts of yeast metabolism, and in beer, wine, and spirits they serve as carriers of flavor and aroma. Examples of fusel alcohols are propanols, butanols, pentanols (e.g., isoamyl alcohol), and hexanols. 3-Methyl-1-butanol (isoamyl alcohol) is the major constituent of fuel oil.

The esters of the formula (I) have preferential suitability as coalescents for the production of coatings such as varnishes, paints, and the like, but also for adhesives.

In one embodiment the esters of the formula (I) are used as coalescents in the production of coatings of any kind based on aqueous polymer dispersions or latex dispersions.

A particularly preferred field for the use of the esters (I) as coalescents is that of the so-called (water-based) emulsion paints.

The esters (I) are very efficient as coalescents, as is apparent from their outstanding capacity to lower the minimum film-forming temperature (MFFT) of aqueous polymer dispersions. Moreover, coatings (films) obtainable using aqueous polymer dispersions comprising the ester (I) for use in accordance with the invention, after four weeks of storage, are in general significantly harder, and hence more robust and less susceptible to soiling, than those produced using commercial coalescents. A further advantage of the esters (I) for use in accordance with the invention is that their boiling point is above 250° C., which is classified, in accordance with the EU regulations 1999/42/EC and 2004/42, as "VOC-free".

The esters (I) for use in accordance with the invention can be used in pure form or in the form of mixtures with one another. If desired, the esters (I) can also be used in combination with known coalescents.

The invention further provides, accordingly, for the use of compositions comprising (1) one or more of the above-defined esters (I) and (2) one or more further compounds—different from the esters (I)—selected from the group of esters, ethers, and hydroxyl esters, as coalescents, especially in connection with the production of coatings of any kind based on aqueous polymer dispersions or latex dispersions, and preferably in the production of coatings based on emulsion paints.

As already stated, the esters (I) for use in accordance with the invention are employed in particular as coalescents for aqueous dispersions of polymer particles or latex particles that are to be filmed. This is the case when the esters (I) are used either alone (in the form of a pure species or a mixture of different species) or in a blend with other coalescents different from them.

The esters (I) are used in this case preferably (in accordance with the MFFT of the polymer) in amounts of 0.1% to 40% by weight and more particularly 2% to 6% by weight, based on the amount of the polymer particles or latex particles whose minimum film-forming temperature is to be lowered.

From a different viewpoint, the amount of the esters (I) may be based on a completed coating formula which is to be applied to a surface. In this respect, the esters (I) are used preferably (in accordance with the MFFT of the polymer) in amounts of 0.1% to 5% by weight and more particularly 0.5% to 2% by weight, based on the overall coating formula.

The skilled person is able to vary the amount of the esters (I) in accordance with the composition of a specific dispersion or of a specific coating formula, and is able, as and when necessary, to use higher amounts of esters (I), particularly if the system comprises polymers with a high minimum film-forming temperature and/or if the MFFT is to be lowered to very low levels.

As far as the nature of the polymer particles or latex particles present in the aqueous dispersions is concerned, there are no particular restrictions. It is possible, accordingly, to use all of the polymers and copolymers that are known in this connection to the skilled person for coating purposes.

Depending on the desired field of application and/or on the nature of the coating, the aqueous dispersions may, moreover, comprise further adjuvants and additives that are known in this connection to the skilled person.

The esters (I) for use in accordance with the invention may be added to the aqueous dispersions immediately after preparation, which is preferably by emulsion polymerization, or else at a later point in time, such as during the preparation of a coating material, for instance.

The aqueous dispersions comprising ester (I) for use in accordance with the invention may be applied in principle to any desired surfaces, as for example to wood, metal, plastic, glass, paper, concrete, masonry, and renders.

Examples

Substances Employed

| | |
|---|---|
| Acronal 290D | aqueous polymer dispersion based on butyl acrylate/styrene (BASF) |
| DI water | fully deionized water |
| Isoamyl octanoate | inventive coalescent = ester with the acid component n-octanoic acid and the alcohol component 3-methylbutan-1-ol and 2-methyl-butan-1-ol (ratio 4:1) |
| Isoamyl decanoate | inventive coalescent = ester with the acid component n-decanoic acid and the alcohol component 3-methylbutan-1-ol and 2-methyl-butan-1-ol (ratio 4:1) |
| Lusolvan FBH | commercial coalescent (BASF) for comparison |
| Loxanol EFC 300 | commercial coalescent (Cognis) for comparison |
| Texanol | commercial coalescent (Eastman) for comparison |
| Scrub fluid | Na n-dodecylbenzylsulfonate, 0.25% in water |
| Tylose MH 30000YP 4 | commercial thickener (SE Tylose) |
| Calgon N | commercial dispersant (BK Guilini) |
| Hydropalat 5040 | commercial dispersant (Cognis) |
| Foamaster 50 | commercial defoamer (Cognis) |

-continued

| | |
|---|---|
| Mistron 754 | commercial filler (Rio Tinto Minerals) |
| Socal P2 | commercial filler (Solvay Chemicals) |
| China Clay B | commercial filler (Imerys) |
| Durcal 2 | commercial filler (Omya) |
| Durcal 5 | commercial filler (Omya) |
| Kronos 2160 | commercial white pigment (Kronos) |
| DSX 1514 | commercial thickener (Cognis) |

Preparation and Assessment of the Coatings

The addition of the test coalescent to the respective polymer dispersion was made with stirring. After an aging time of 24 hours, the systems were applied to glass plates by doctor blade (wet film thickness 150 μm). After drying had taken place, the films were assessed, using a variety of test methods. The test results are shown in Tables 1 to 3.

Test Methods Used

The minimum film-forming temperature (MFFT) was tested in accordance with DIN 53787. The experiment results are shown in Table 1.

The König pendulum hardness was tested in accordance with DIN 53157. The experiment results are shown in Table 1.

The odor test was carried out as follows: 3 g of material were placed in an 850 ml plastic beaker, which was sealed with a lid overnight. Subsequent the odor was assessed by a ten-person odor panel, according to the following rating system:

5=no odor; 4=perceptible odor; 3=perceptible odor, fairly unpleasant; 3=perceptibleodor, fairly unpleasant; 2=perceptible odor, unpleasant; 1=very strong odor, very unpleasant. The experiment results are shown in Table 2.

The wash and scrub resistance was carried out in accordance with DIN ISO 11998. The test paint used here was the following formula, an emulsion paint based on styrene acrylate (Acronal 290 D) (data in parts by weight):

| | |
|---|---|
| Water | 13.0 |
| Tylose MH 30000YP 4 (2.0% in H2O) | 7.0 |
| Calgon N (10% in water) | 0.7 |
| Hydropalat 5040 (40%) | 0.4 |
| Foamaster 50 | 0.3 |
| Mistron 754 | 7.0 |
| Socal P2 | 13.0 |
| China Clay B | 3.0 |
| Durcal 2 | 10.0 |
| Durcal 5 | 20.0 |
| Kronos 2160 | 8.0 |
| NaOH (10% in water) | 0.2 |
| These components were dispersed at 2000 rpm for 30 minutes, after which the following components were added: | |
| Foamaster 50 | 0.4 |
| DSX 1514, 40% | 0.4 |
| Acronal 290D (50%) | 10.0 |
| Water | 4.6 |
| Total | 98.0 |

Specialty sheets (Leneta) were coated, using a film-drawing apparatus, with the above formula (blank sample=no coalescent) or with this formula to which the particular coalescent under test had been added (v=11.43 mm/s), dry film thickness about 200 μm. Drying operation (3-stage drying): a) 24 hours at 23° C. and 50% relative humidity, then b) 24 h 50° C., and c) 24 h 23° C. 50% relative humidity, the scrub test instrument used being as follows: Erichsen, model 494; 200 scrub motions were performed.

The experiment results are shown in Table 3.

Experiment Results

MFFT Values, Film Appearance, Pendulum Hardness

The procedure was as follows: First of all the additive under investigation was added to the binder/water mixture and stirred slowly at 1500 rpm for 3 minutes. Thereafter the samples were stored at room temperature for one day. Finally they were drawn down with a 100 μm applicator and tested for compatibility, with the pendulum hardness also being ascertained after 7 days and after 4 weeks. Furthermore, the minimum film-forming temperature (MFFT) was measured.

The experiment results are compiled in tables 1a to 1c below.

In the column headings, 0 denotes the blank sample (without coalescent); the digits 1 to 15 represent the experiment numbers.

TABLE 1a

|  | 0 | 1 | 2 | 3 | 4 |
|---|---|---|---|---|---|
| Acronal 290 D | 80.0 | 80.0 | 80.0 | 80.0 | 80.0 |
| DI water | 20.0 | 20.0 | 20.0 | 20.0 | 20.0 |
| Isoamyl octanoate | — | 0.8 | 1.6 | 2.4 | — |
| Lusolvan FBH | — | | | | 0.8 |
| Total (parts by weight) | 100.0 | 100.8 | 101.6 | 102.4 | 100.8 |
| MFFT in ° C. | 15.0° C. | 8.5° C. | 2.0° C. | 0° C. | 10.0° C. |
| Film appearance | slightly hazy, homogeneous | slightly hazy, homogeneous | slightly hazy, homogeneous | slightly hazy, homogeneous | slightly hazy, homogeneous |
| König pendulum hardness [sec] | | | | | |
| after 7 days' drying at 23° C./50% rel. humidity | 49 | 14 | 18 | 24 | 25 |
| after 28 days' drying at 23° C./50% rel. humidity | 50 | 33 | 28 | 28 | 22 |

TABLE 1b

|  | 5 | 6 | 7 | 8 | 9 |
|---|---|---|---|---|---|
| Acronal 290 D | 80.0 | 80.0 | 80.0 | 80.0 | 80.0 |
| DI water | 20.0 | 20.0 | 20.0 | 20.0 | 20.0 |
| Lusolvan FBH | 1.6 | 2.4 | | | |
| Isoamyl decanoate | | | 0.8 | 1.6 | 2.4 |
| Total (parts by weight) | 101.6 | 102.4 | 100.8 | 101.6 | 102.4 |
| MFFT in ° C. | 3.0° C. | 0° C. | 8.0° C. | 2° C. | 0° C. |
| Film appearance | slightly hazy, homogeneous | slightly hazy, homogeneous | slightly hazy, homogeneous | slightly hazy, homogeneous | slightly hazy, homogeneous |
| König pendulum hardness [sec] | | | | | |
| after 7 days' drying at 23° C./50% rel. humidity | 18 | 17 | 25 | 16 | 14 |
| after 28 days' drying at 23° C./50% rel. humidity | 26 | 29 | 29 | 24 | 23 |

TABLE 1c

|  | 10 | 11 | 12 | 13 | 14 | 15 |
|---|---|---|---|---|---|---|
| Acronal 290 D | 80.0 | 80.0 | 80.0 | 80.0 | 80.0 | 80.0 |
| DI water | 20.0 | 20.0 | 20.0 | 20.0 | 20.0 | 20.0 |
| Loxanol EFC 300 | 0.8 | 1.6 | 2.4 | | | |
| Texanol | | | | 0.8 | 1.6 | 2.4 |
| Total (parts by weight) | 100.8 | 101.6 | 102.4 | 100.0 | 100.0 | 100.0 |
| MFFT in ° C. | 10.0° C. | 0° C. | 0° C. | 13° C. | 7° C. | 0° C. |
| Film appearance | slightly hazy, homogeneous | slightly hazy, homogeneous | slightly hazy, homogeneous | slightly hazy, homogeneous | slightly hazy, homogeneous | slightly hazy, homogeneous |
| König pendulum hardness [sec] | | | | | | |
| after 7 days' drying at 23° C./50% rel. humidity | 18 | 15 | 11 | 25 | 14 | 10 |
| after 28 days' drying at 23° C./50% rel. humidity | 29 | 25 | 25 | 28 | 18 | 15 |

TABLE 2

Odor testing

|  | TEX | FBH | IAO | IAD | LOX |
|---|---|---|---|---|---|
| Sampler 1 | 3 | 2 | 4 | 4 | 2 |
| Sampler 2 | 2 | 2 | 3 | 3 | 3 |
| Sampler 3 | 4 | 3 | 3 | 4 | 2 |
| Sampler 4 | 3 | 2 | 4 | 4 | 2 |
| Sampler 5 | 3 | 2 | 4 | 4 | 1 |
| Sampler 6 | 4 | 3 | 5 | 5 | 3 |
| Sampler 7 | 4 | 3 | 4 | 4 | 3 |
| Sampler 8 | 4 | 3 | 5 | 5 | 4 |
| Sampler 9 | 4 | 3 | 4 | 4 | 1 |
| Sampler 10 | 3 | 2 | 4 | 5 | 3 |
| Average | 3.4 | 2.5 | 4 | 4.2 | 2.4 |

In the column headings of Table 2 the meanings are as follows: TEX = Texanol; FBH = Lubosolvan FBH; IAO = isoamyl octanoate; IAD = isoamyl decanoate; LOX = Loxanol EFC 300

TABLE 3

Wash and scrub resistance

| Coalescents | g/m² |
|---|---|
| none | 191 |
| Lusolvan FBH 1.0% | 125 |
| Lusolvan FBH 2.0% | 166 |
| Lusolvan FBH 3.0% | 116 |
| Isoamyl octanoate 1.0% | 113 |
| Isoamyl octanoate 2.0% | 96 |
| Isoamyl octanoate 3.0% | 105 |
| Isoamyl decanoate 1.0% | 126 |
| Isoamyl decanoate 2.0% | 143 |
| Isoamyl decanoate 3.0% | 177 |
| Loxanol EFC 300 1.0% | 109 |
| Loxanol EFC 300 2.0% | 81 |
| Loxanol EFC 300 3.0% | 116 |
| Texanol 1.0% | 95 |
| Texanol 2.0% | 60 |
| Texanol 3.0% | 59 |

The % data for the coalescents in Table 3 refer to % by weight of coalescents based on the overall formulas subjected to the test for wash and scrub resistance.

The invention claimed is:

1. A method of assisting film forming, the method comprising forming one or more esters whose acid component is a monocarboxylic acid having 8 to 12 C atoms and whose alcohol component is selected from the group of the pentanols as coalescents, wherein the alcohol component comprises a mixture of 3 methylbutan-1-ol and 2-methylbutan-1-ol in a weight ratio of 4:1, adding the one or more esters to a film-forming composition, and forming a coating from the film-forming composition.

2. The method of claim 1, further comprising adding other coalescents which differ structurally from the one or more esters to the film-forming composition.

3. The method of claim 1, wherein the film-forming composition comprises an aqueous polymer dispersion or a latex dispersion.

4. The method of claim 3, wherein the film-forming composition comprises an aqueous emulsion paint.

5. The method of claim 1, wherein the acid component comprises n-octanoic acid.

6. The method of claim 1, wherein the acid component comprises n-decanoic acid.

* * * * *